(12) United States Patent
Danneville et al.

(10) Patent No.: US 12,706,625 B2
(45) Date of Patent: Aug. 11, 2026

(54) SIGNAL DETECTOR

(71) Applicants: UNIVERSITE DE LILLE, Lille (FR); CENTRE NATIONAL DE LA RECHERCHE SCIENTIFIQUE, Paris (FR); CENTRALE LILLE INSTITUT, Mlleneuve d'Ascq (FR); UNIVERSITE POLYTECHNIQUE HAUTS-DE-FRANCE, Valenciennes (FR)

(72) Inventors: François Danneville, Lille (FR); Christophe Loyez, Festubert (FR)

(73) Assignee: UNIVERSITE DE LILLE, Lille (FR)

( * ) Notice: Subject to any disclaimer, the term of this patent is extended or adjusted under 35 U.S.C. 154(b) by 15 days.

(21) Appl. No.: 18/688,120

(22) PCT Filed: Sep. 1, 2022

(86) PCT No.: PCT/EP2022/074304
§ 371 (c)(1),
(2) Date: Feb. 29, 2024

(87) PCT Pub. No.: WO2023/031324
PCT Pub. Date: Mar. 9, 2023

(65) Prior Publication Data

US 2024/0356574 A1 Oct. 24, 2024

(30) Foreign Application Priority Data

Sep. 1, 2021 (FR) ..................................... 21 09148

(51) Int. Cl.
*H04B 1/16* (2006.01)

(52) U.S. Cl.
CPC ................................. *H04B 1/1638* (2013.01)

(58) Field of Classification Search
CPC .................................................... H04B 1/1638
USPC .......................................................... 375/340
See application file for complete search history.

(56) References Cited

U.S. PATENT DOCUMENTS

2006/0115018 A1* 6/2006 Kang ...................... H04L 27/06 375/324
2010/0329390 A1* 12/2010 Chow ................ H04L 25/0268 455/41.1
2022/0263472 A1 8/2022 Moody et al.

OTHER PUBLICATIONS

International Search Report dated Dec. 16, 2022.
French Search Report dated Aug. 12, 2022.
Von Der Marks et al: "Ultra low power wakeup detector for sensor networks", Microwave and Optoelectronics Conference, 2007. IMOC 2007. SBMO/IEEE M TT-S International, IEEE, PI, Oct. 29, 2007 (Oct. 29, 2007), pp. 865-868, ISBN: 978-1-4244-0660-9.

(Continued)

*Primary Examiner* — Dominic D Saltarelli
(74) *Attorney, Agent, or Firm* — IPSILON USA, LLP

(57) ABSTRACT

A signal, in particular radio-frequency signal, detector (10), such as a detector of wake-up radio type has a first circuit (20) receiving at its input the signal, configured to set the operating point (M) at the output to a predefined DC voltage (Vm_DC) to which a variable part (ΔVm) which is dependent on the signal from the input is added.

A second circuit (30) is connected at its input to the output of the first circuit (20) and configured to amplify the variable part (ΔVm) of the signal, this second circuit has a chain of at least two logic inverters (32) in a cascade and operating below the threshold.

19 Claims, 8 Drawing Sheets

(56) References Cited

OTHER PUBLICATIONS

Pletcher NM et al: "A 52 W Wake-Up 1-19 Receiver With 72 dBm Sensitivity Using an Uncertain-IF Architecture", IEEE Journal of Solid-State Circuits, IEEE, USA, vol. 44, No. 1, Jan. 1, 2009 (Jan. 1, 2009), pp. 269-280, ISSN: 0018-9200.
Emil Nilsson et al: "Ultra Low Power 1-19 Wake-Up Radio Using Envelope Detector and Transmission Line Voltage Transformer", IEEE Journal on Emerging and Selected Topics in Circuits and Systems, IEEE, Piscataway, NJ, USA, vol. 3, No. 1, Mar. 1, 2013 (Mar. 1, 2013), pp. 5-12, ISSN: 2156-3357.

* cited by examiner

SIGNAL DETECTOR

RELATED APPLICATION

This application is a National Phase of PCT/EP2022/074304 filed on Sep. 1, 2022, which claims the benefit of priority from French Patent Application No. 21 09148 filed on Sep. 1, 2021, the entirety of which are incorporated by reference.

TECHNICAL FIELD

The present invention relates to the field of signal detectors, and more particularly but not exclusively that of detectors of wake-up radio type.

PRIOR ART

Current receivers, be they electromagnetic, acoustic or indeed infrared, consume a non-trivial amount of power in order to continuously scan their immediate environment in order to be able to detect existent signals, whatever the power of these signals (from a very low power of the order of −90 dBm up to higher powers). This power consumption on the part of receivers forms an obstacle to the power autonomy of current communicating devices and of onboard electronics in general.

Thus, in the radio-frequency field, and more particularly that of the Internet of things (IoT), the most recent protocols, such as LoRaWAN, are confronted with this obstacle. Indeed, the role of receivers is considerably reduced therein and the notion of repeater is ultimately not used because it is power-intensive. More generally, in order to increase the autonomy of wireless sensors, strategies are put in place in the top layers, based on scenarios of putting the sensors on standby and intermittent phases of waking them up.

For example, a communicating sensor has its role confined to the role of transmitter. Intermittently or in the event of an alarm, it sends information originating from a measurement which it makes (temperature, humidity level, etc.) For certain applications, this use may appear sufficient but it is in reality very limiting, since the sensor cannot play the role of repeater, given that its receiving function is not permanently activated. The result is that each sensor of the network must be within range of the sink.

The aforementioned strategies are not effective and inevitably lead to information losses and restricted network performance, while at the same time burdening the protocols. In addition, solutions involving wake-up radio receivers are deployed, but these have a limited range. It is therefore necessary to recharge these sensors more or less frequently (several days to several months) depending on use.

Conventional architectures of the prior art are either homodyne or heterodyne, and generally comprise a low-noise amplifier followed by a frequency conversion device involving an internal frequency source.

In order to significantly reduce power consumption, the concept on which these architectures are based requires the transmission frequency or the sensitivity of the receiver to be decreased. When the transmission frequency is contained, this does not make it possible to cover the majority of the applications developing in the ISM bands, notably in Europe, where these are above 800 MHz. When sensitivity is severely affected (−40 dBm), this amounts to dividing the range of the transmitted radio signal by 100 in comparison with an advertised sensitivity of −90 dBm, which amounts to having a range of 100 metres of maximum transmission distance, instead of 10 km. This is a weighty argument against downgrading sensitivity.

The application WO 2020/242540 relates to low-power radio-frequency receivers and associated circuits.

The publications Von der Mark et al. "Ultra low power Wakeup Detector for Sensor Networks" and Nilsson et al. "Ultra Low Power Wake-Up Radio Using Envelope Detector and Transmission Line Voltage Transformer" disclose architectures of detectors of wake-up radio type with low power consumption.

OBJECTS AND SUMMARY

There is a need to further improve signal detectors, notably in terms of power consumption.

The invention aims to meet this objective and its subject is, according to one of its aspects, a signal, in particular radio-frequency signal, detector, notably a detector of wake-up radio type, comprising:

- a first circuit receiving at its input the signal, configured to set the operating point at the output to a predefined DC voltage to which a variable part which is dependent on the signal from the input is added, and
- a second circuit connected at its input to the output of the first circuit and configured to amplify the variable part of the signal, this second circuit comprising a chain of at least two logic inverters, which are preferably produced from CMOS technology, are positioned in a cascade and operate below the threshold.

The invention provides a detector having a simple architecture, making it possible to continuously scan the immediate environment of a radio-frequency transceiver, for example, and to detect the low-power signals present, while at the same time reducing power consumption by several orders of magnitude in comparison with certain known solutions.

Indeed, by virtue of operating below the threshold, it is possible to obtain a power improvement of up to 5 orders of magnitude for frequencies of the signal beyond 500 MHz, that is to say for the majority of the ISM (industry, science, medicine) bands, and relating to the majority of mainstream protocols (Bluetooth, Wi-Fi, LoRa, etc.).

The invention makes it possible to escape the usual compromise between the performance and the power consumption of conventional receivers. Indeed, in the case of the architectures listed in the literature or present in current commercial systems, reduction of power consumption is always accompanied by strict limitation of the operating duty cycle and/or sensitivity and/or frequency, the duty cycle being defined as being the ratio between the operation time and the total elapsed time. These limitations have considerable repercussions on the accessible frequency bands, the range and the use time of current low-power-consumption architectures.

Being able to dedicate up to 100,000 times less power to scanning and detecting the signals present in the environment, without reducing the frequency, the sensitivity or the duty cycle, makes possible a real breakthrough in the field of the power autonomy of the wireless systems which populate everyday life.

First Circuit

Preferably, the first circuit comprises a bridge of MOS transistors in series which are connected by a midpoint forming the output of the first circuit, the input of the first circuit corresponding to the gate of one of the transistors.

The MOS transistors of the bridge advantageously operate below the threshold. This makes it possible to obtain an additional power gain.

The bridge of MOS transistors preferably comprises a pull-up transistor and a pull-down transistor, the signal being applied to the gate of the pull-up transistor and a control voltage being applied to the gate of the pull-down transistor.

The MOS transistors of the bridge are preferably of NMOS type. The MOS transistors of the bridge are alternatively of PMOS, or CMOS, type (notably one PMOS and the other NMOS, with signal and control voltages applied in an ad hoc fashion for correct operation of the detector).

Supply Voltages

Preferably, the first and/or second circuit is/are supplied with voltages Vdd and −Vss such that |Vdd−Vss| is between 0 V and 0.6 V.

The voltage Vdd may be between 0 V and 300 mV and/or the voltage −Vss may be between −300 mV and 0 V.

Such supply voltage values are suitable for operation below the MOS transistor threshold and make it possible to obtain low power consumption (of the order of a hundred pW) with a sensitivity of the order of −90 dBm, or even below −100 dBm depending on the frequency tuning circuit present between the receiving antenna and the detector according to the invention, and to do so for frequencies of the signal of the order of several tens and hundreds of GHz.

Second Circuit

In a second embodiment, a first part of the chain of inverters is configured to work without saturation, and a second part of the chain of inverters following the first being configured to work in saturation mode so that the signal at the output of each inverter of the second substantially reaches the values Vdd and −Vss. Thus, the input signal is converted into a digital output signal.

The second circuit may be connected at the output of one inverter of the chain to an artificial neuron, in order, for example, to process the signal received by means of an artificial neuron circuit.

The artificial neuron may be of leaky integrate-and-fire type.

The detector is advantageously used for generating electrical pulses in order to supply a spiking neuron network (SNN), notably a third-generation one, the signal being modulated.

The detector may be a radiocommunication receiver, notably one able to demodulate the signal.

The second circuit may be an artificial neuron of axon hillock type and comprise:

- a feedback capacitor connected between the input and the output of the second circuit, and
- a negative-feedback transistor, notably of NMOS type, controlled by the output voltage of the second circuit at the gate, and one terminal of which, notably the drain, is connected to the input of the second circuit.

The detector may comprise a membrane capacitor, this membrane capacitor notably being the input capacitor of the first inverter of said chain.

The detector is, for example, used for generating electrical pulses in order to provide a received signal strength indicator RSSI, the signal being a continuous wave CW.

The detector may then be used in networks of communicating objects in order to make an estimate of the distance at which the transmission source is located.

Telecommunications Node

Another subject of the invention is, according to another of its aspects, a telecommunications node comprising the detector according to the invention, a main transceiver and a control unit, the detector being configured to send, upon detecting the signal, a switching signal to the control unit, the latter being configured to activate, upon receiving the switching signal, the main transceiver, and to make it move, for example, from an inactive mode to an active mode. Thus, the detector may have a low power and be constantly active, and detect the signal instead of the main transceiver, which is activated only following reception of the activation signal, this making it possible to drastically reduce the power consumption of the telecommunications node and to increase its autonomy.

Detection Method

Another subject of the invention is, according to another of its aspects, a method for detecting a signal having a frequency between 1 Hz and 1 THz and a power notably between −110 dBm and +0 dBm, using the detector according to the invention, comprising detecting the signal by means of the detector, the latter preferably being continuously active, and generating a digital signal at the output of the detector.

Preferably, the radio-frequency signal is modulated according to one of the following modulation schemes: amplitude-shift keying (ASK), on-off keying (OOK), pulse-position modulation (PPM) and pulse-width modulation (PWM).

The detector may detect amplitude-modulated narrowband signals. The notion of narrowband is defined by a bandwidth not exceeding 20% of the centre frequency. This covers numerous current radio-frequency applications.

BRIEF DESCRIPTION OF THE DRAWINGS

The invention may be better understood upon reading the following description of non-limiting exemplary implementations thereof, and upon examining the appended drawing, in which.

DETAILED DESCRIPTION

Figure 1:
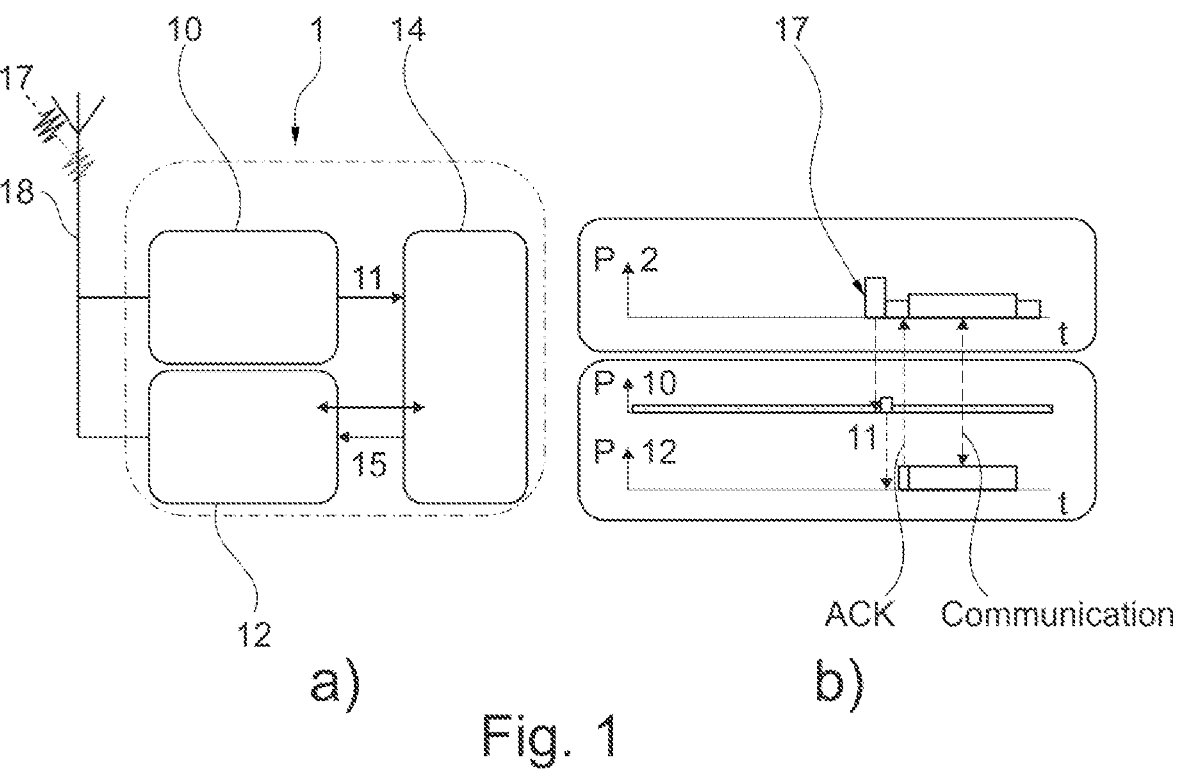
FIG. 1 is a diagram illustrating the detector according to the invention, used as a wake-up radio receiver in a telecommunications system.

FIG. 1*a*) schematically illustrates an exemplary detector 10 according to the invention implemented in a telecommunications node 1 forming part of a network of wireless sensors. In addition to the detector 10, the telecommunications node 1 comprises a main transceiver 12 and a control unit 14, for example a microcontroller. The detector 10 is connected at its input to an antenna 18, notably an RF antenna, and at its output to the control unit 14, which communicates with the main transceiver 12.

The timing diagrams of FIG. 1*b*) illustrate the power of the signals as a function of time. The detector 10 is continuously monitoring the radio channel, unlike the main transceiver 12. Upon receiving an RF signal 17 sent by another telecommunications node 2, the detector 10 sends a switching signal 11 to the control unit 14, which activates the main transceiver 12 by means of an activation signal 15. Once activated, the transceiver 12 acknowledges receipt of the signal 17 and enters into communication with the node 2 for exchanging data. Thus, the detector 10 acts as a wake-up radio by "waking up" the main transceiver 12.

The detector 10 may also be used as a demodulator of the received RF signal, making it possible to continuously recover the information attached to the carrier of the RF signal and thus fulfil the function of a radiocommunication receiver operating in extremely low power consumption conditions (gain of 100,000), all the performance qualities remaining otherwise the same.

Figure 2:
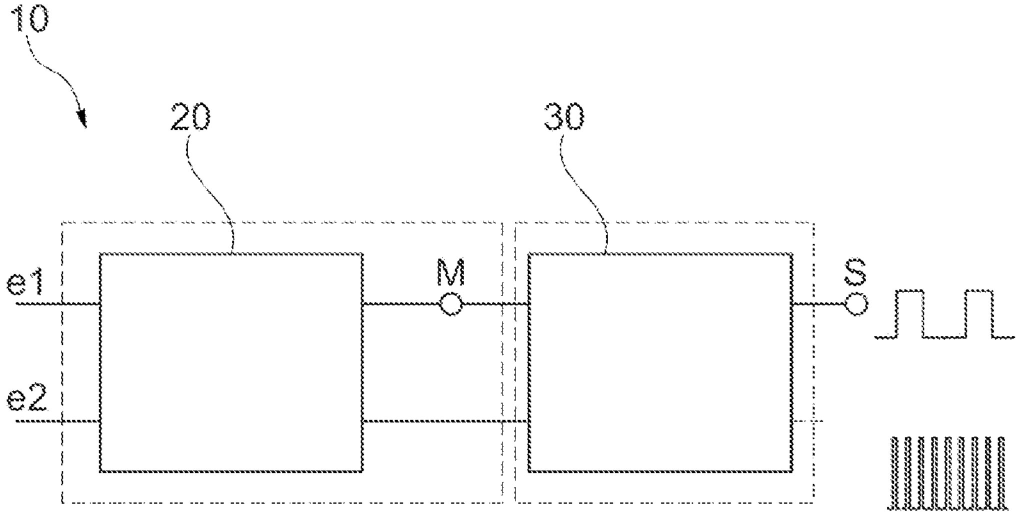
FIG. 2 is a block diagram of the detector according to the invention.

As shown in FIG. 2, the detector 10 according to the invention comprises a first circuit 20 and a second circuit 30 which is connected at the output of the first circuit 20.

The first circuit 20 possesses two inputs: an input e1 to which the RF signal to be detected is applied and an input e2 to which a control voltage is applied. The purpose of the first circuit 20 is to set the operating point at the output to a predefined DC voltage to which a variable part which is dependent on the signal from the input e1 is added. The structure and the operation of the first circuit 20 will be described in detail below.

The waveform of the signal at the output S of the second circuit 30 depends on the architecture of the latter and on the waveform of the RF signal at the input, that is to say on the use which is made of the detector 10, as will be explained below. The signal at the output of the second circuit is either in binary form after demodulation of the modulated RF signal applied at the input, or in the form of electrical pulses, the frequency of which is proportional to the power of the RF signal applied at the input in CW (continuous wave) mode.

Figure 3:
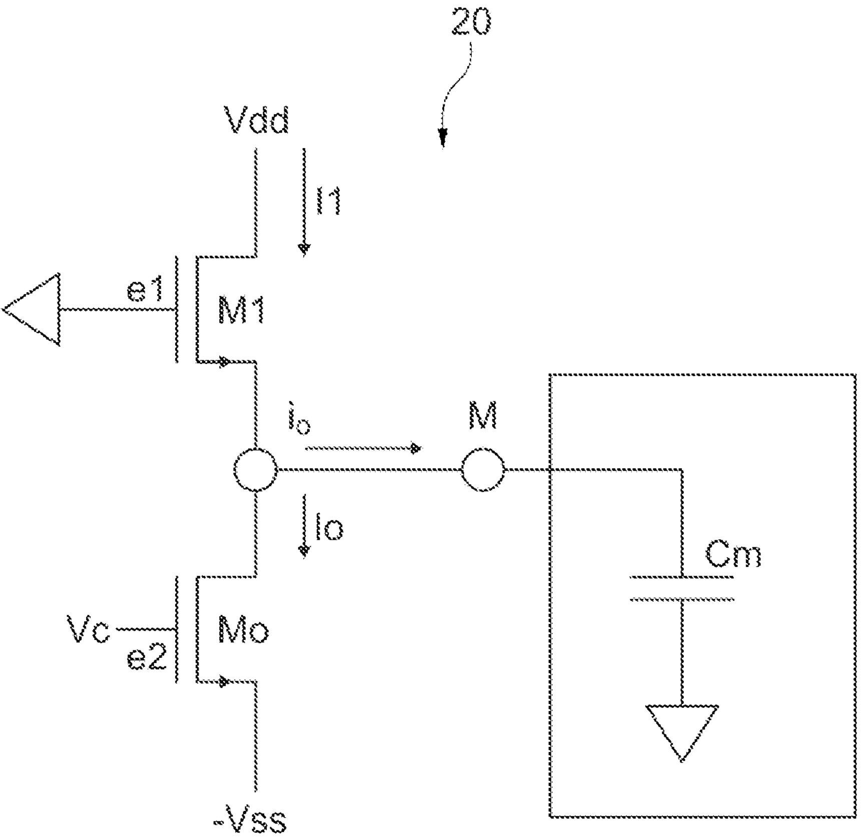
FIG. 3 schematically shows an exemplary first detector circuit according to the invention, in the steady state.

FIG. 3 schematically shows an exemplary embodiment of the first circuit 20, depicting the currents flowing in the steady state. The first circuit 20 comprises a bridge of NMOS transistors which are connected at a midpoint M: a pull-up transistor M1 and a pull-down transistor M0.

The drain of the transistor M1 is connected to the supply voltage Vdd, its source to the midpoint M and its gate defines the input e1. In the steady state, no RF signal is applied to the gate of the transistor M1. Thus, everything proceeds as if this gate was connected to ground. The drain of the transistor M0 is connected to the midpoint M, its source to the supply voltage −Vss and its gate defines the input e2 to which a control voltage Vc is applied. Thus, the transistor M0 operates as a constant current source I0 making it possible to adjust the quiescent DC voltage of the point M.

The fan-out of the first circuit 20 is modelled by a capacitor Cm at the input of the second circuit 30.

The potential at the point M, labelled Vm, is adjusted so that the gate-source voltage $V_{gs1}$ of M1, which is equal to (−Vm), is below the threshold voltage Vth of the transistor M1. It should be noted that, if Vss=0 V, this condition is de facto met.

In these conditions, the following analytical relationships are obtained, I1 being the drain current of M1, V0 the thermal stress, n the ideality coefficient, k the Boltzmann constant, T the ambient temperature and q the electric charge of an electron:

$$I1 = Is_1 \cdot e^{\frac{Vgs1}{Vo}} = e^{\frac{-Vm}{Vo}} \quad \text{[Math 1]}$$

$$\left(\text{Vo} = \frac{n \cdot k \cdot T}{q} = 40 \text{ mV}, n = 1.5\right)$$

$$Io = Is_o \cdot e^{\frac{Vc}{Vo}} \text{ (constant current source)}$$

Without an RF signal applied, the voltage Vm in DC terms, labelled Vm_DC, may be deduced from these relationships:

$$\text{Vm\_DC} = \text{Vo} \cdot \ln\left(\frac{Is_1}{Is_0}\right) - \text{Vc} \quad \text{[Math 2]}$$

It should be noted that this potential Vm_DC may be adjusted using Vc, if the lengths L and widths W of the gates of the transistors M1 and M0, respectively, are otherwise fixed.

It should also be noted that the transconductance of the transistor M1 is equal to:

$$Gm1 = \frac{\partial I1}{\partial \text{Vgs1}} = \frac{I1}{\text{Vo}} \quad \text{[Math 3]}$$

Figure 4:
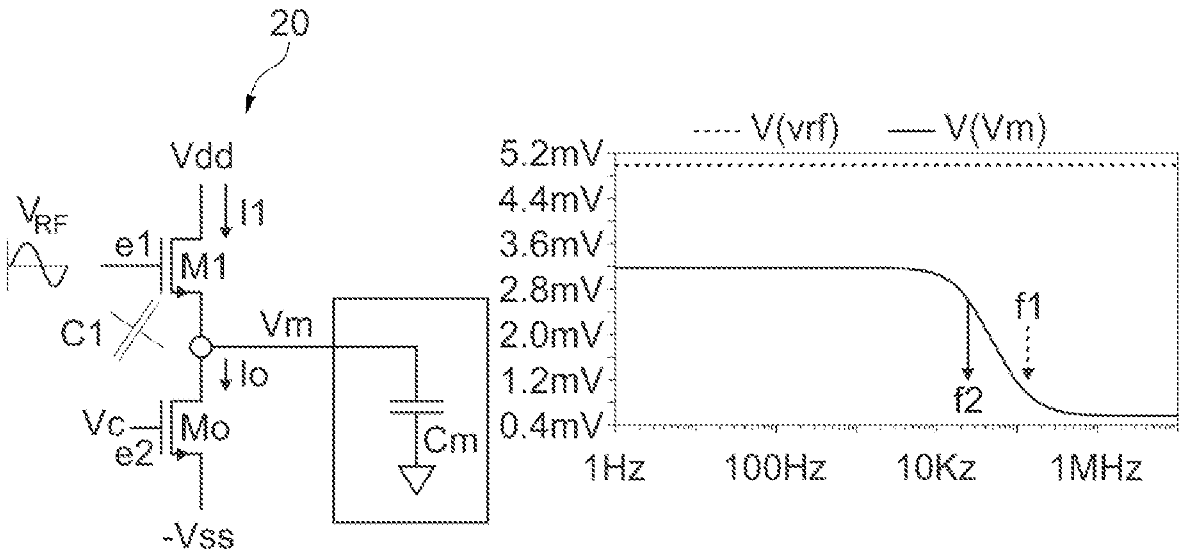
FIG. 4 schematically shows an exemplary first detector circuit according to the invention, in the small-signal state.

The behaviour of the circuit in the small-AC-signal state, in particular the behaviour of the voltage Vm in this state, is illustrated in FIG. 4, a sinusoidal voltage being applied to the gate of M1.

The transmittance of the circuit Vm/VRF is of the following form, f being the frequency of the RF signal:

$$\frac{Vm}{VRF} = \alpha \cdot \frac{1 + j \cdot \frac{f}{f_1}}{1 + j \cdot \frac{f}{f_2}} \quad \text{[Math 4]}$$

As a first approximation:

$$f_1 = \frac{Gm1}{2 \cdot \pi \cdot Cm} \text{ and } f_2 = \frac{Gm1}{2 \cdot \pi \cdot (C1 + Cm)} \quad \text{[Math 5]}$$

At high frequency, and in particular at frequencies where the RF signal is present, the ratio (Vm/VRF) is constant, and proportional to the ratio C1/(Cm+C1), this corresponding to a capacitive divider. It may be seen that:

(i) on the one hand, the amplitude of the voltage Vm is low, but non-zero, and attenuated with respect to that of the RF signal, and (ii) on the other hand, there is residual voltage variation (set as a first approximation by the capacitive bridge).

In order to study the behaviour of the first circuit 20 charged by the input capacitor Cm of the second circuit 30, the nonlinearity of the function $I_D(V_{GS})$ (drain current as a function of the gate-source voltage) of the pull-up transistor M1 is utilized, in order to calculate the incremental DC value of the detected voltage Vm (in the steady state, after a rise time which follows the application of an RF signal).

Figure 5:
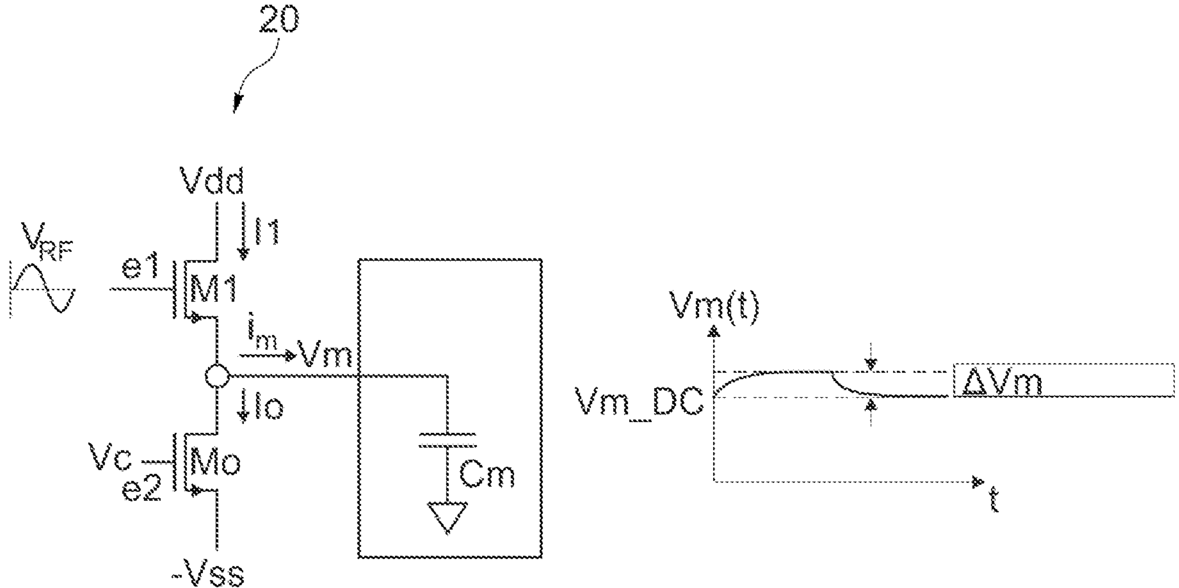
FIG. 5 schematically shows an exemplary first detector circuit according to the invention, in the large-signal state.

The "conversion" of the signal $V_{RF}$, generated at a frequency $f_{RF}$, into an incremental DC voltage ΔVm, is illustrated in FIG. 5. The value of this increment ΔVm may range from several hundred μV to several mV.

Starting from the expression of $I1(V_{GS})$ of M1:

$$I1 = Is_1 \cdot e^{\frac{Vgs1}{Vo}} \quad \text{[Math 6]}$$

ΔVm being low, the following is obtained:

$$Vgs1 \approx Vgs1\_DC + V_{RF} \quad \text{[Math 7]}$$

$$I1 = Is_1 \cdot e^{\frac{(Vgs1\_DC + V_{RF})}{Vo}} = I1\_DC \cdot \left[1 + \frac{V_{RF}}{Vo} + \frac{1}{2} \cdot \left(\frac{V_{RF}}{Vo}\right)^2\right] \quad \text{[Math 8]}$$

$$V_{RF} = Vs \cdot \cos(\omega t)$$

Furthermore, the current $i_m$ assimilated by the capacitor Cm is equal to:

$$i_m = I1 - Io, \text{ with } Io = I1\_DC \quad \text{[Math 9]}$$

The DC value of the current $i_m$ is deduced therefrom:

$$i_m\_DC = I1\_DC \cdot \frac{Vs^2}{4 \cdot Vo^2} \quad \text{[Math 10]}$$

Thus, when an RF signal is present, an incremental DC current im_DC, which is proportional to the root-mean-square value of the RF voltage, is delivered by the pull-up transistor M1 and directed towards the capacitor Cm. This current im_DC charges the impedance of a capacitive nature Cm present at the point M.

After a transient time, the voltage Vm at the point M is modified by an incremental value with respect to its value at rest (in the steady state). If the RF signal is applied in CW mode, Vm will maintain this new value.

Figure 6:
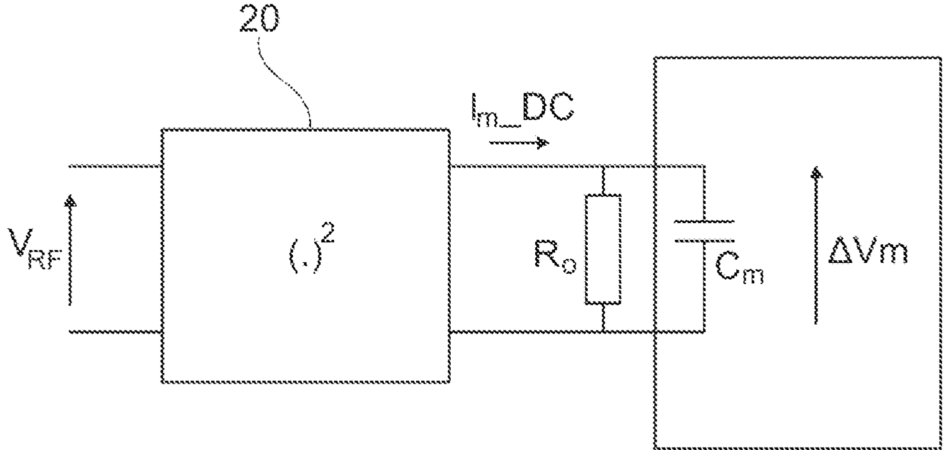
FIG. 6 schematically shows an equivalent circuit of the circuit of the example of FIG. 5.

The circuit 20 is thus equivalent to the circuit illustrated in FIG. 6. It may be seen that the circuit 20 has a quadratic function with an output impedance equivalent to the capacitor Cm branching off a resistor R0. The transistor M1 being connected as a "common drain", R0 is defined by:

$$R_o \sim \frac{1}{Gm1} = \frac{Vo}{I1\_DC} \quad \text{[Math 11]}$$

Thus, as soon as an RF voltage is applied to the circuit, an incremental voltage ΔVm is observed, which is written in the time domain in the form:

$$\Delta Vm = Ro \cdot im\_DC \cdot \left(1 - e^{-\frac{t}{\tau}}\right), \text{ with } \tau = R_o \cdot C_m = \left(\frac{1}{2 \cdot \pi \cdot f1}\right) \quad \text{[Math 12]}$$

This is therefore a most classic case of capacitor charging, with an ultimate value of ΔVm, after simplification, equal to:

$$\Delta Vm[\text{DC voltage}] = \frac{V_S^2}{4 \cdot V_o} \quad \text{[Math 13]}$$

It should be noted that a variable part of the voltage Vm is superimposed on this voltage increment (cf. behaviour in the small-AC-signal state described above). When there is no longer an RF signal, the pull-down transistor Mo (constant current source) discharges the capacitor Cm, restoring the voltage Vm, after a transient time, to the value Vm_DC which was set in the steady state.

When the RF signal is modulated, taking into account the small increment ΔVm with respect to the value Vm_DC, it is useful to amplify this ripple. When the primary objective is to demodulate, the last amplification stages should saturate the signal which is amplified between the values Vdd and −Vss. The amplification chain comprises, to this end, a series of inverters connected in a cascade in sufficient numbers.

Figure 7:
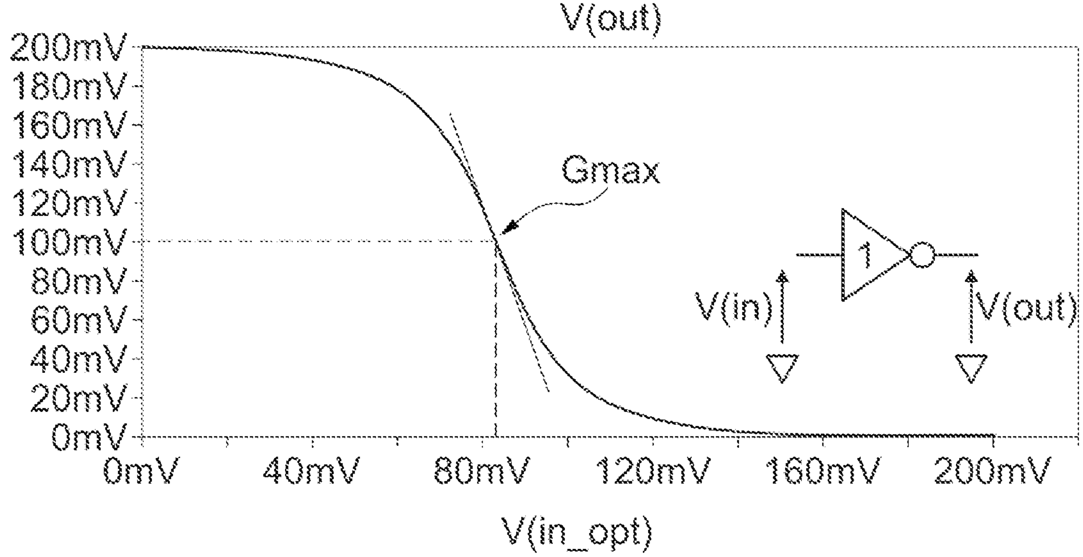
FIG. 7 schematically shows a transfer characteristic of a CMOS inverter below the threshold.

A reminder of the transfer characteristic of a CMOS inverter below the threshold is given in FIG. 7, Gmax being the maximum voltage gain which may be obtained. This characteristic is plotted in the conditions: Vdd=200 mV and Vss=0 V. In order to benefit from the maximum voltage gain, the voltage V(in) must be adjusted to an optimum value V(in_opt).

Figure 8:
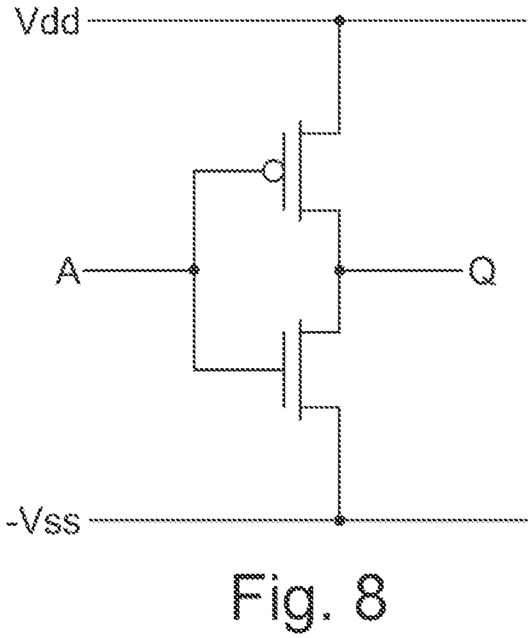
FIG. 8 schematically shows a circuit of a CMOS inverter.

A reminder of the circuit of a CMOS inverter is given in FIG. 8. This circuit, having A as input and Q as output, consists of a bridge of CMOS transistors which are connected in series and connected by their drains to the output Q. The input A is applied to the gates of the pull-up PMOS and pull-down NMOS transistors.

Figure 9:
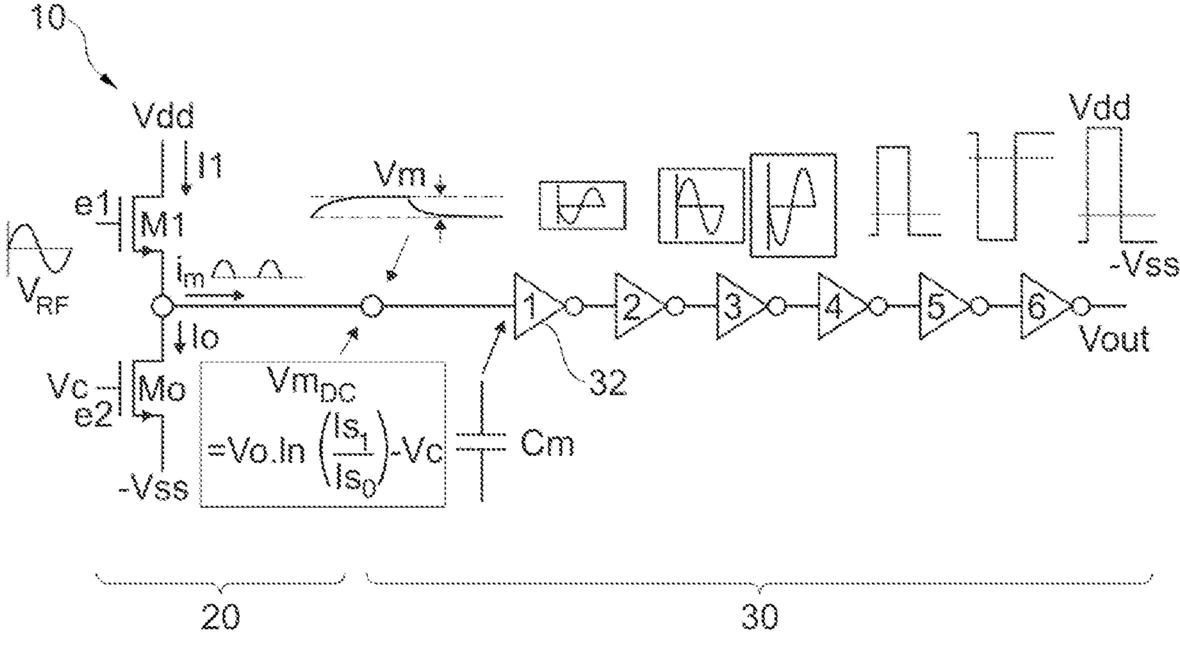
FIG. 9 schematically shows an exemplary detector circuit according to the invention.

FIG. 9 schematically illustrates an exemplary second circuit 30 consisting of six inverters 32 in a cascade. The first three inverters of the chain amplify the ripple Vm without saturation. The last three inverters of the chain are configured to work in saturation mode, so that the signal at the output of each of the last three inverters substantially reaches the values Vdd and −Vss. It should be noted that, for a second circuit operating as an open loop, an even number of inverters 32 should be used in a cascade in the chain.

For optimum operation, it is useful to adjust the voltage Vm of the first inverter 32 to a value close to V(in_opt), so as to fully benefit from the optimum voltage gain of this first inverter 32. Care should, however, be taken, when the control voltage Vc is adjusted, that the output voltage Vout remains at −Vss.

It should be noted that the capacitor Cm corresponds, in the example of FIG. 9, to the input capacitor of the first inverter.

Figure 10:
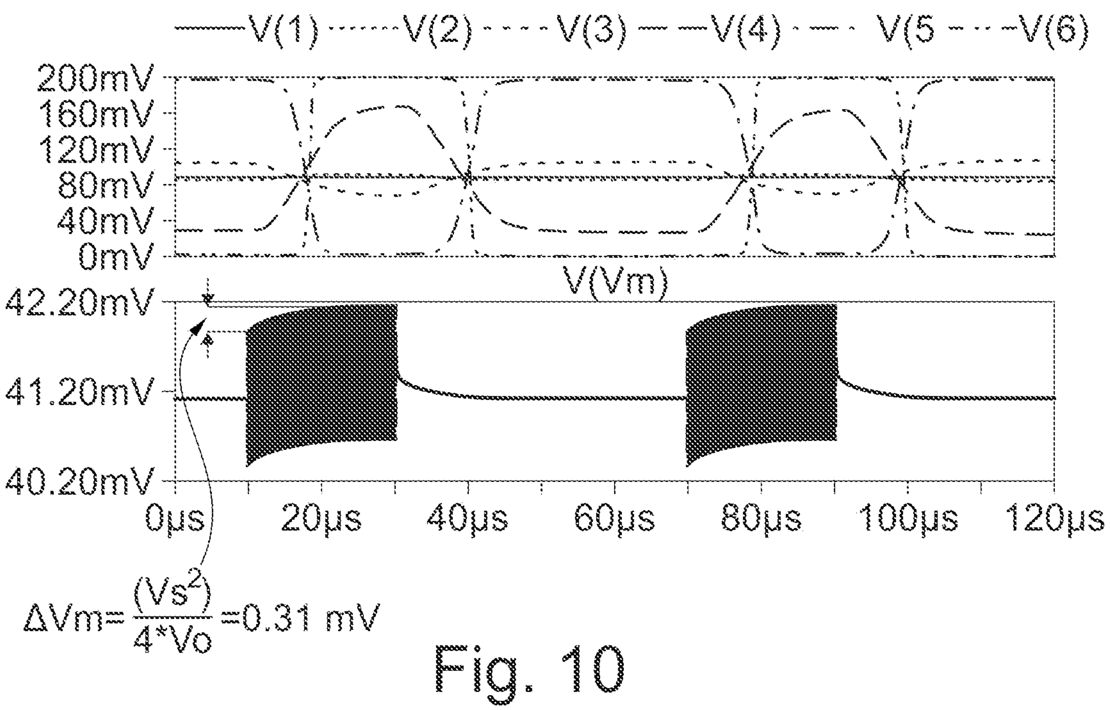
FIG. 10 illustrates the curve of the signal at the input of the cascade of inverters which is shown in FIG. 9 as well as the curve of the signal obtained at the output of each inverter.

In the presence of an RF signal, taking into account the previous adjustment, the ripple ΔVm shown in FIG. 10 is first of all amplified ("small-signal" operation of the first three inverters), in order to ultimately reach an amplitude such that the last three inverters have a saturated output voltage, that is to say that the latter takes values equal to Vdd and −Vss, a feature of the RF signal which is demodulated into baseband form. FIG. 10 shows the various signals V(k) obtained at the output of each inverter of rank k in the chain of inverters in a cascade.

It should be noted that, for a simulation of the circuit of FIG. 9, with an RF signal at the input having a frequency of 1 GHz and an amplitude Vs of 7 mV, the power consumption is 100 pW. This is a consumption several orders of magnitude lower than those of the prior art (for example, with respect to the circuit described in the publication Huang et al. "A 915 MHz ultra-low power wake-up receiver with scalable performance and power consumption"). It should be noted that, for the example of FIG. 9, the variation ΔVm approximately corresponds to the value given by theory.

Figure 11:
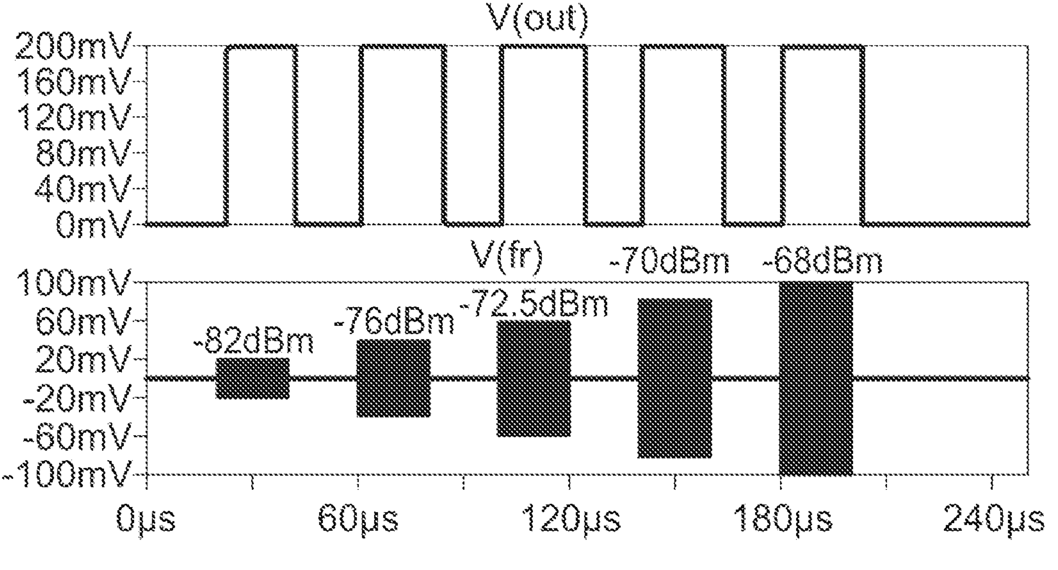
FIG. 11 illustrates the waveform of the signal at the output of the detector of FIG. 9 for various amplitudes of the signal at the input of the detector.

FIG. 11 shows the waveform at the output of the circuit of FIG. 9 supplied with Vdd=200 mV and Vss=0 V, and does so for various amplitudes Vs of the RF signal (varying from 20 mV to 100 mV). A correspondence in terms of (theoretical) RF powers is also indicated. The output voltage makes it possible to make a decision on the binary value of the symbols modulating the RF carrier.

Figure 12:
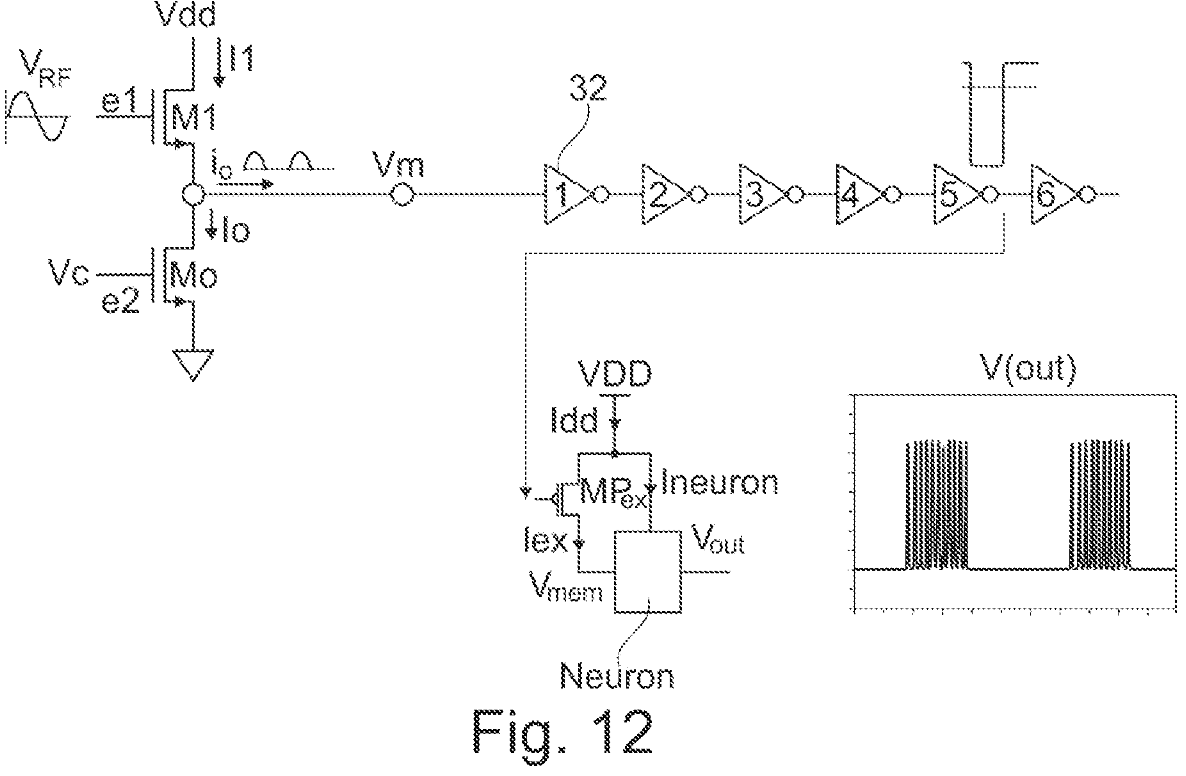
FIG. 12 is similar to FIG. 9, with the second circuit connected to an artificial neuron.

FIG. 12 shows that it is possible to connect the output of one inverter of the chain, in this instance the penultimate inverter, of rank 5, to a generic artificial neuron (for example, of leaky integrate-and-fire type) as illustrated in the figure. This makes it possible to generate electrical pulses which may be put to use to feed a spiking neural network (SNN). It should be noted that the frequency of the pulses produced does not depend on the amplitude of the RF signal.

Figure 13:
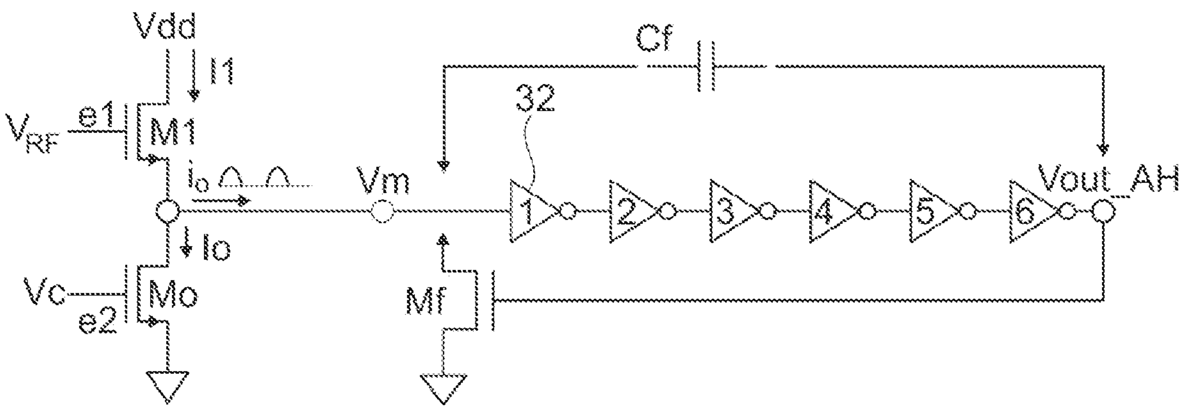
FIG. 13 is analogous to FIG. 9, with the second circuit converted into an artificial neuron.

The principle that a voltage across the terminals of a capacitor assimilates a current as described above may also be applied by associating with the first circuit 20 any artificial neuron acting as a second circuit 30 having a membrane capacitor. By way of illustration, the circuit presented in FIG. 12 may be directly transformed into an integrate-and-fire artificial neuron (i.e. proposed by Carver Mead since 1989). An example of such a circuit is shown in FIG. 13.

As illustrated in this figure, two components have been added to the circuit 30 of FIG. 9: a feedback capacitor Cf connected between the input and the output of the second circuit 30 (note that the membrane capacitor in this case consists of the input capacitor Cm of the first inverter 32 of the chain), and a feedback transistor Mf, in this instance of NMOS type, controlled by the output voltage of the second circuit 30 at the gate, the drain of which is connected to the input M of the second circuit and the source to ground.

This is thus the artificial neuron commonly called an axon hillock (AH) in the literature. It should be noted that the control voltage Vc, which serves to adjust the membrane voltage Vm of the AH neuron in the steady state, is unchanged with respect to the open-loop circuit previously described in FIG. 12.

When a CW RF signal is applied, the pulse at the output Vout_AH is triggered when the membrane voltage Vm reaches the switching threshold of the first inverter, causing positive feedback which contributes to a rapid increase of the voltage Vm, before the transistor Mf rapidly resets this voltage Vm and subsequently resets the output voltage Vout_AH.

Figure 14:
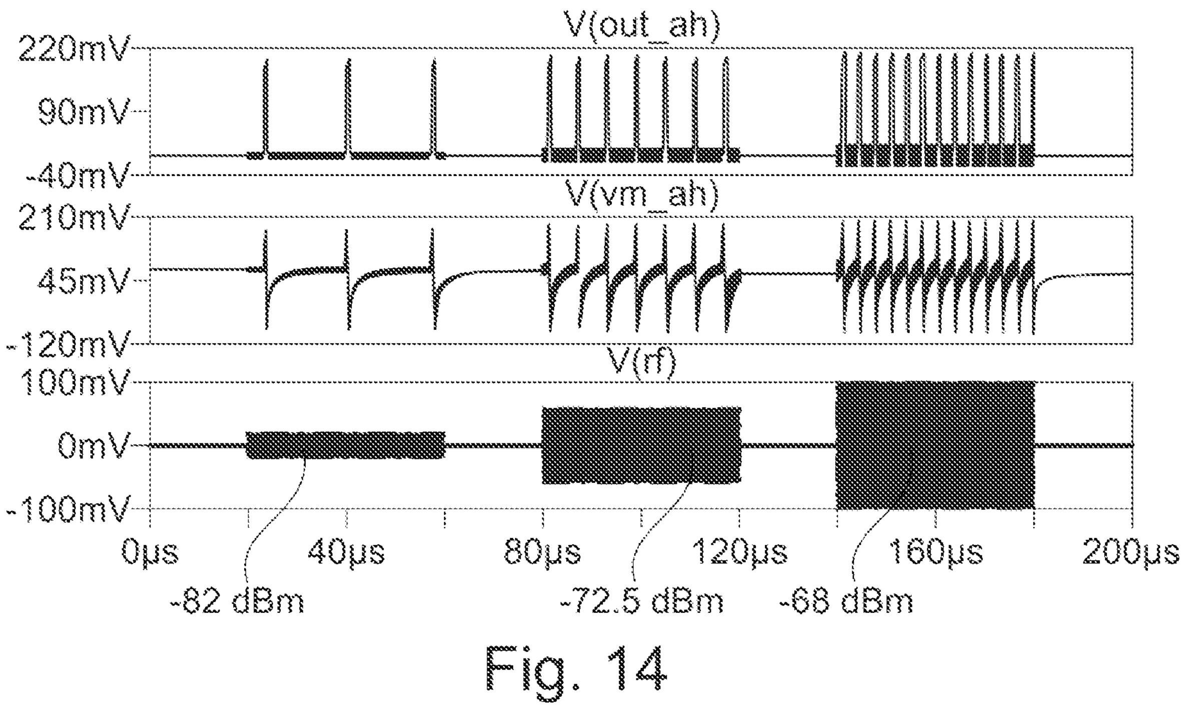
FIG. 14 shows exemplary curves of signals relating to the circuit of FIG. 13.

The simulations illustrated in FIG. 14 present respective time curves of the membrane voltage Vm and of the output of the AH neuron (Vout_AH), for various amplitudes of the RF signal which is applied to the gate of the transistor M1.

Figure 15:
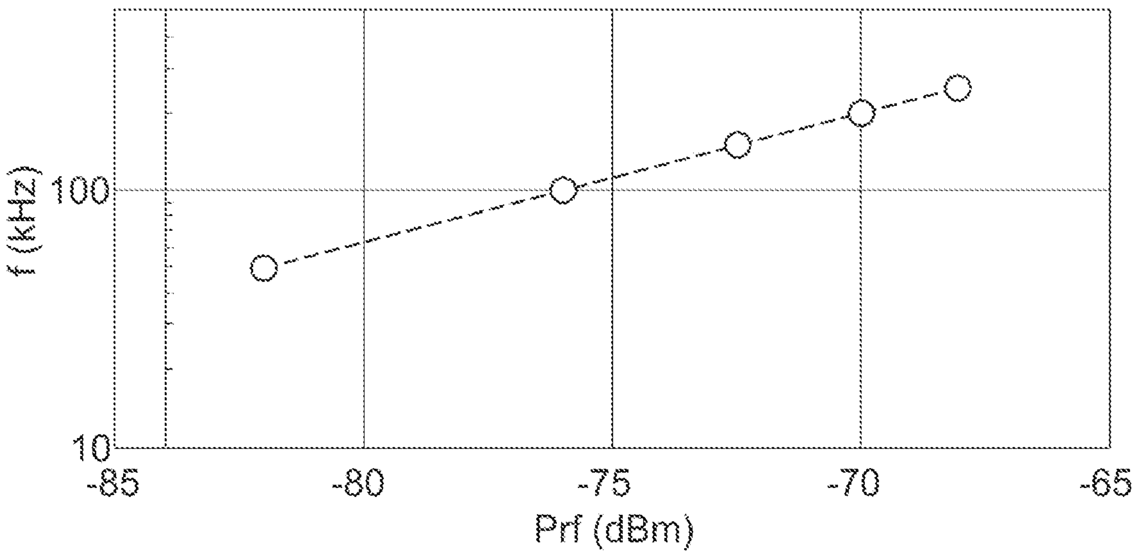
FIG. 15 is a graph showing the frequency of the electrical pulses which are obtained at the output of the circuit of FIG. 13, depending on the power of the signal at the input.

Unlike pulses generated using a generic artificial neuron as described above in relation to FIG. 12, the frequency of the pulses generated in the example of FIG. 13 is dependent on the power of the RF signal. The frequency of the pulses as a function of the RF power is shown in FIG. 15. This curve shows the potential of this circuit to operate in the capacity of an RSSI, with an RF power (in this instance varying from −82 dBm to −62 dBm) coded as pulse frequencies (from50 kHz to 250 kHz). The linear dependency of the frequency of the pulses on the RF power should also be noted.

The invention is not limited to the exemplary embodiments described above.

Although the examples illustrated relate more particularly to the radio-frequency field, the detector according to the invention is compatible with the detection of waves in the acoustic or optical, notably infrared, bands.

The invention claimed is:

1. A signal detector comprising:

a first circuit receiving at its input the signal, configured to set the operating point at the output to a predefined DC voltage to which a variable part which is dependent on the signal from the input is added, and a second circuit connected at its input to the output of the first circuit and configured to amplify the variable part of the signal, this second circuit comprising a chain of at least two logic inverters are positioned in a cascade and operate at a subthreshold operating regime, wherein the predefined DC voltage is selected to bias the input of at least one logic inverter of the second circuit into the subthreshold operating regime.

2. The signal detector according to claim 1, the first circuit comprising a bridge of MOS transistors in series which are connected by a midpoint forming the output of the first circuit, the input of the first circuit corresponding to the gate of one of the transistors.

3. The signal detector according to claim 2, the MOS transistors of the bridge operating below the threshold.

4. The signal detector according to claim 2, the bridge of MOS transistors comprising a pull-up transistor and a pull-down transistor, the signal being applied to the gate of the pull-up transistor and a control voltage being applied to the gate of the pull-down transistor.

5. The signal detector according to claim 2, the MOS transistors of the bridge being of NMOS type.

6. The signal detector according to claim 1, the first and/or second circuit being supplied with voltages Vdd and −Vss such that |Vdd−Vss| is between 0 V and 0.6 V.

7. The signal detector according to claim 6, the voltage Vdd being between 0 V and 300 mV and/or the voltage −Vss being between −300 mV and 0 V.

8. The signal detector according to claim 1, a first part of the chain of inverters being configured to work without saturation, and a second part of the chain of inverters following the first being configured to work in saturation mode so that the signal at the output of each inverter of the second substantially reaches values Vdd and −Vss.

9. The signal detector according to claim 1, the second circuit being connected at the output of one inverter of the chain to an artificial neuron.

10. The signal detector according to claim 9, the artificial neuron being of leaky integrate-and-fire type.

11. The signal detector according to claim 1, which is a radiocommunication receiver.

12. The signal detector according to claim 1, the second circuit being an artificial neuron of axon hillock type and comprising:

a feedback capacitor connected between the input and the output of the second circuit, and a feedback transistor controlled by the output voltage of the second circuit at the gate, and one terminal of which is connected to the input of the second circuit.

13. The signal detector according to claim 12, comprising a membrane capacitor being the input capacitor of the first inverter of said chain.

14. A method for generating electrical pulses in order to supply a spiking neural network (SNN) with the signal detector of claim 8, wherein the signal being modulated.

15. A method for generating electrical pulses in order to provide a received signal strength indicator RSSI with the signal detector of claim 11, wherein the signal being a continuous wave CW.

16. The method as claimed in claim 15 further comprising estimating the distance at which the transmission source is located in networks of communicating objects with the signal detector.

17. A telecommunications node comprising the detector according to claim 1, a main transceiver and a control unit the detector being configured to send, upon detecting the signal, a switching signal to the control unit, the latter being configured to activate, upon receiving the switching signal, the main transceiver.

18. A method for detecting a signal having a frequency between 1 Hz and 1 THz, using the detector according to claim 1, comprising detecting the signal by means of the detector and generating a digital signal at the output of the detector.

19. The method according to claim 18, the radio-frequency signal being modulated according to one of the following modulation schemes: amplitude-shift keying, on-off keying, pulse-position modulation and pulse-width modulation.

* * * * *